(12) United States Patent
Kuji et al.

(10) Patent No.: US 10,197,149 B2
(45) Date of Patent: Feb. 5, 2019

(54) V-BELT TYPE CONTINUOUSLY VARIABLE TRANSMISSION

(71) Applicant: KAWASAKI JUKOGYO KABUSHIKI KAISHA, Hyogo (JP)

(72) Inventors: Yasuhiro Kuji, Hyogo (JP); Seiji Itoo, Akashi (JP); Ayumi Hamada, Akashi (JP)

(73) Assignee: KAWASAKI JUKOGYO KABUSHIKI KAISHA, Hyogo ( * ) Notice: Subject to any disclaimer, the term of this patent is extended or adjusted under 35 U.S.C. 154(b) by 57 days.

(21) Appl. No.: 15/077,984

(22) Filed: Mar. 23, 2016

(65) Prior Publication Data

US 2017/0276234 A1    Sep. 28, 2017

(51) Int. Cl.
| | |
|---|---|
| *B62J 13/00* | (2006.01) |
| *F16D 1/00* | (2006.01) |
| *F16H 57/02* | (2012.01) |
| *F16H 57/04* | (2010.01) |
| *F16H 9/12* | (2006.01) |
| *F16H 57/035* | (2012.01) |
| *F16H 57/027* | (2012.01) |

(52) U.S. Cl.
CPC .......... *F16H 57/0416* (2013.01); *F16H 9/12* (2013.01); *F16H 57/027* (2013.01); *F16H 57/035* (2013.01); *F16H 57/0489* (2013.01)

(58) Field of Classification Search
CPC ............. F16H 57/0489; F16H 57/0415; F16H 57/035; F16H 57/05; F01P 2025/40
USPC .................................. 474/144, 93; 180/68.1
See application file for complete search history.

(56) References Cited

U.S. PATENT DOCUMENTS

| | | | | |
|---|---|---|---|---|
| 1,880,493 A | * | 10/1932 | Rundlett | B60H 1/00464 165/108 |
| 1,980,109 A | * | 11/1934 | Stockly | F24F 3/147 165/103 |
| 2,205,975 A | * | 6/1940 | Heyer | F16H 57/0412 236/68 R |
| 2,703,680 A | * | 3/1955 | Nallinger | B60H 1/08 237/12.3 B |
| 3,664,129 A | * | 5/1972 | Schwab | F01P 7/044 137/468 |
| 3,783,613 A | * | 1/1974 | Billings | F01K 15/02 60/626 |
| 4,422,498 A | * | 12/1983 | Chen | B23Q 11/127 165/47 |
| 4,631,977 A | * | 12/1986 | Kawashima | B62M 9/06 474/150 |
| 4,708,699 A | * | 11/1987 | Takano | F02B 77/13 474/144 |

(Continued)

*Primary Examiner* — Henry Y Liu
(74) *Attorney, Agent, or Firm* — Wenderoth, Lind & Ponack, L.L.P.

(57) ABSTRACT

A V-belt type continuously variable transmission of an air-cooled type mounted on a vehicle. The V-belt type continuously variable transmission includes an intake port for taking air into the V-belt type continuously variable transmission, and an exhaust port for exhausting air from the V-belt type continuously variable transmission. The V-belt type continuously variable transmission further includes at least one of an electric intake fan connected to the intake port directly or via an intake duct, and an electric exhaust fan connected to the exhaust port directly or via an exhaust duct.

5 Claims, 7 Drawing Sheets

(56) References Cited

U.S. PATENT DOCUMENTS

| | | | | |
|---|---|---|---|---|
| 5,062,330 A * | 11/1991 | Trautmann | B23B 9/005 | 310/112 |
| 5,125,368 A * | 6/1992 | Tzavaras | F16H 57/0412 | 123/41.31 |
| 5,172,752 A * | 12/1992 | Goetz, Jr. | F28D 1/0426 | 123/41.49 |
| 5,725,048 A * | 3/1998 | Burk | B60H 1/034 | 165/236 |
| 5,971,290 A * | 10/1999 | Echigoya | B60H 1/00485 | 237/12.3 A |
| 5,976,044 A * | 11/1999 | Kuyama | F02B 61/02 | 474/146 |
| 6,076,739 A * | 6/2000 | Littleford | F24F 3/044 | 165/222 |
| 6,267,700 B1 * | 7/2001 | Takayama | F02B 61/02 | 474/144 |
| 6,544,134 B2 * | 4/2003 | Ohyama | B62M 7/12 | 474/144 |
| 6,571,751 B2 * | 6/2003 | Vogt | F01P 7/044 | 123/41.12 |
| 6,807,926 B2 * | 10/2004 | Shiozaki | F01P 7/042 | 123/41.12 |
| 6,848,348 B2 * | 2/2005 | Liao | B23Q 11/127 | 165/48.1 |
| 6,951,492 B2 * | 10/2005 | Gibbs | B60F 3/0053 | 440/12.5 |
| 6,959,239 B2 * | 10/2005 | Williams | F16H 59/72 | 477/76 |
| 7,186,960 B2 * | 3/2007 | Cho | H05B 6/804 | 219/679 |
| 7,217,222 B2 * | 5/2007 | Centlivre | B60W 10/06 | 477/98 |
| 7,427,248 B2 * | 9/2008 | Chonan | F16H 57/05 | 474/150 |
| 7,497,288 B2 * | 3/2009 | Tsukada | B60K 1/00 | 180/68.1 |
| 7,845,452 B2 * | 12/2010 | Bennett | B60B 3/142 | 180/233 |
| 7,870,892 B2 * | 1/2011 | Gawthrop | B60H 1/004 | 165/202 |
| 8,323,134 B2 * | 12/2012 | Tsukada | F16H 61/66259 | 474/144 |
| 8,684,682 B2 * | 4/2014 | Akashi | F28D 1/022 | 415/178 |
| 8,840,496 B2 * | 9/2014 | Yamanishi | B60K 11/08 | 180/68.1 |
| 8,911,312 B2 * | 12/2014 | Itoo | F16H 57/03 | 474/93 |
| 9,366,331 B2 * | 6/2016 | Eberhardt | F16H 57/0416 | |
| 2001/0029215 A1 * | 10/2001 | Ohyama | B62M 7/12 | 474/148 |
| 2002/0166517 A1 * | 11/2002 | Vogt | F01P 7/044 | 123/41.12 |
| 2003/0066696 A1 * | 4/2003 | Nakamura | B62K 5/01 | 180/68.1 |
| 2003/0172883 A1 * | 9/2003 | Shiozaki | F01P 7/042 | 123/41.12 |
| 2004/0224806 A1 * | 11/2004 | Chonan | F16H 57/0415 | 474/93 |
| 2006/0011401 A1 * | 1/2006 | Nakamura | B62K 5/01 | 180/309 |
| 2006/0027192 A1 * | 2/2006 | Tsukada | B60K 1/00 | 123/41.7 |
| 2006/0090942 A1 * | 5/2006 | Hastings | F16H 57/0415 | 180/68.1 |
| 2006/0270503 A1 * | 11/2006 | Suzuki | F16H 57/0489 | 474/144 |
| 2007/0219030 A1 * | 9/2007 | Ho | F16H 57/035 | 474/144 |
| 2008/0032572 A1 * | 2/2008 | Burgoyne | B60F 3/0053 | 440/88 C |
| 2008/0201036 A1 * | 8/2008 | Karlsson | G01M 13/021 | 701/29.2 |
| 2008/0314676 A1 * | 12/2008 | Ishida | B62K 11/04 | 180/366 |
| 2009/0095462 A1 * | 4/2009 | Ramaswamy | F01P 7/04 | 165/288 |
| 2010/0155170 A1 * | 6/2010 | Melvin | B60K 11/08 | 180/339 |
| 2010/0167853 A1 * | 7/2010 | Morita | F16H 9/18 | 474/13 |
| 2011/0036311 A1 * | 2/2011 | Kardos | F01P 7/026 | 123/41.59 |
| 2011/0288717 A1 * | 11/2011 | Yu | B60K 11/085 | 701/31.4 |
| 2012/0288377 A1 * | 11/2012 | Hartman | F01P 7/042 | 417/13 |
| 2012/0289370 A1 * | 11/2012 | Yamanishi | B60K 11/08 | 474/93 |
| 2012/0328454 A1 * | 12/2012 | Roby | F01P 7/048 | 417/319 |
| 2013/0240319 A1 * | 9/2013 | Weeter | F16D 13/72 | 192/70.12 |
| 2014/0080664 A1 * | 3/2014 | Hartz | B60K 6/40 | 477/5 |
| 2014/0301829 A1 * | 10/2014 | Reinhardt | F01D 25/162 | 415/111 |
| 2015/0024890 A1 * | 1/2015 | Eberhardt | F16H 57/0416 | 474/144 |
| 2015/0137631 A1 * | 5/2015 | Schrage | H02K 9/08 | 310/54 |
| 2016/0091071 A1 * | 3/2016 | Vanderpool | F16H 48/34 | 475/150 |

* cited by examiner

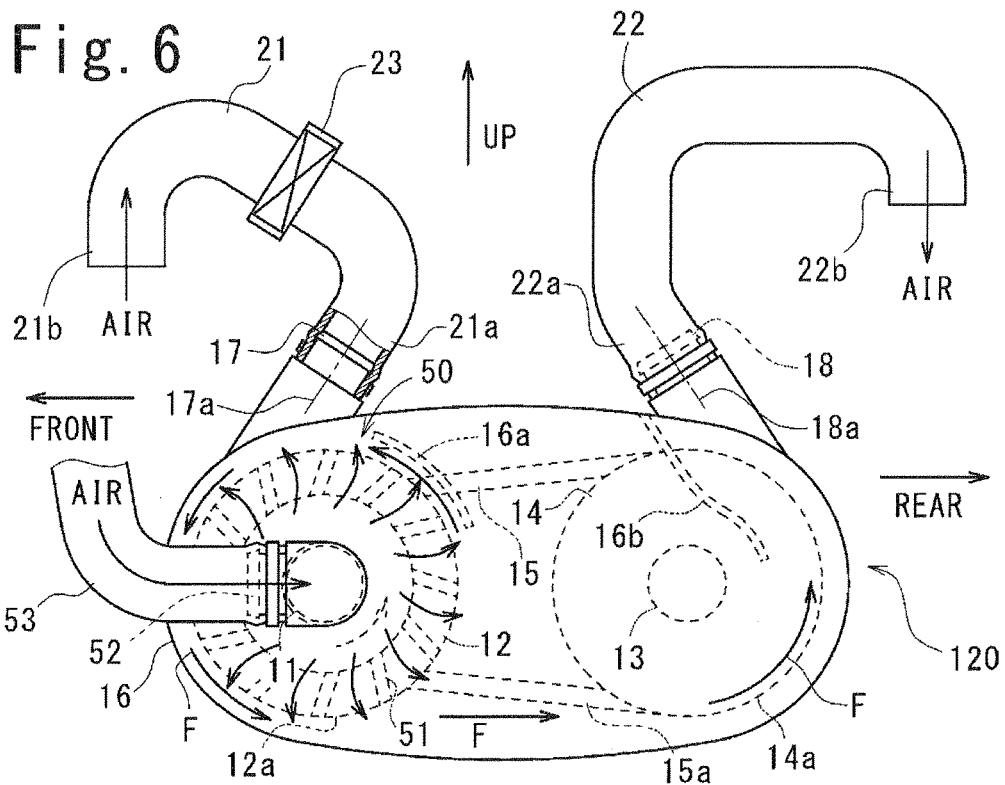
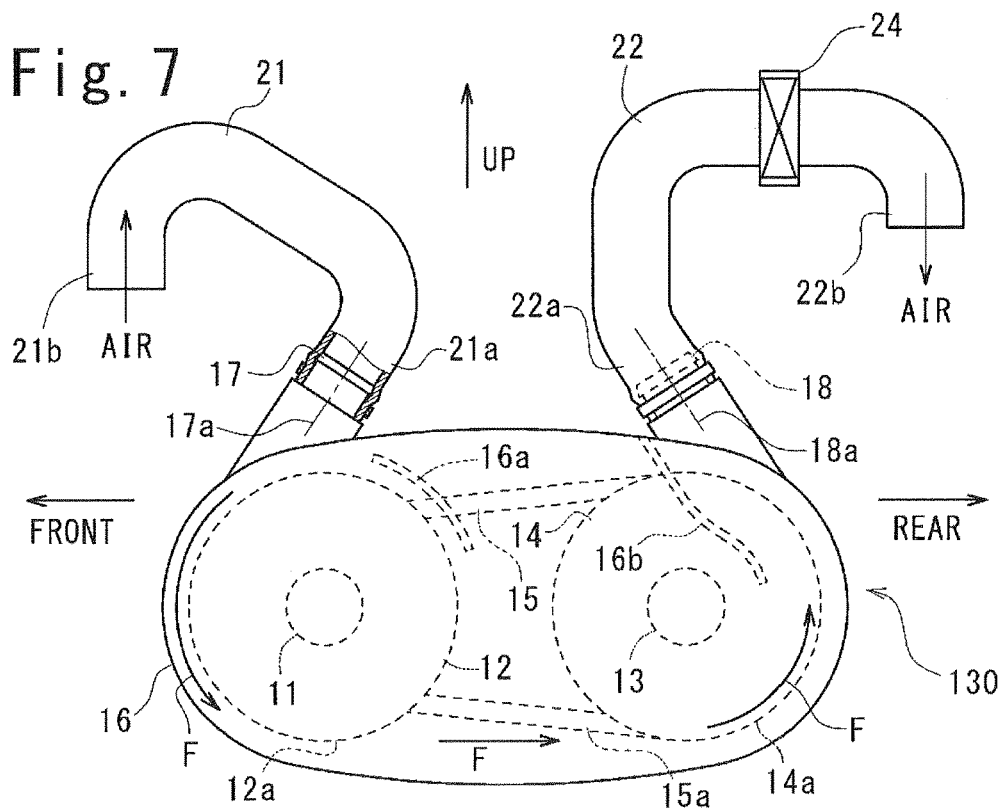

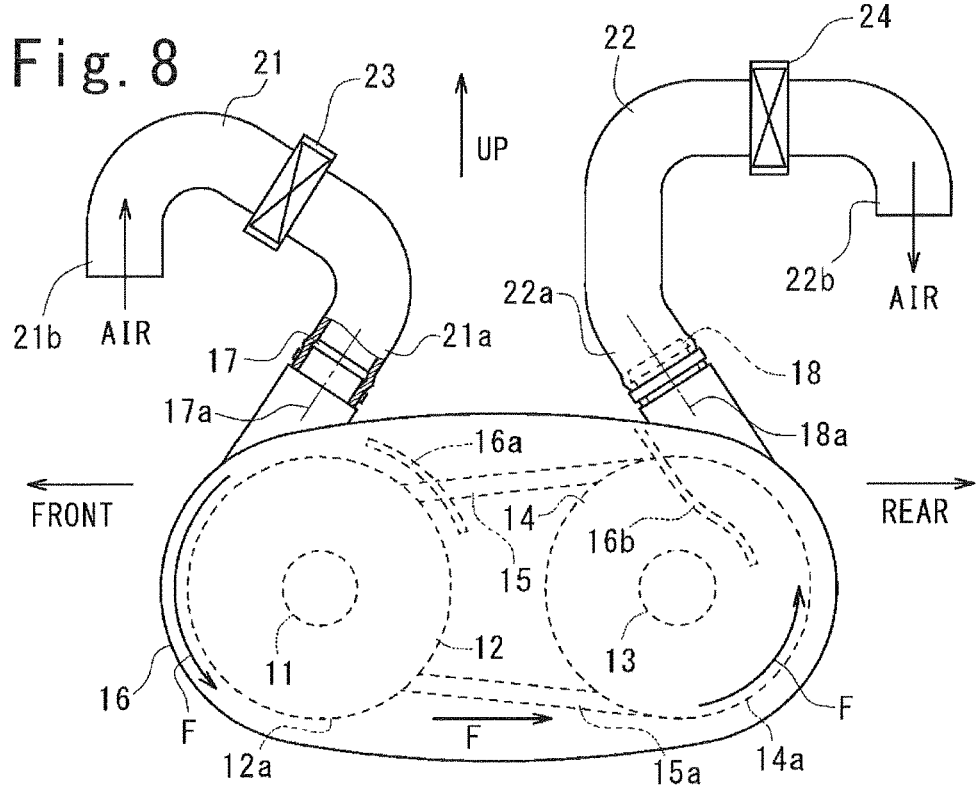
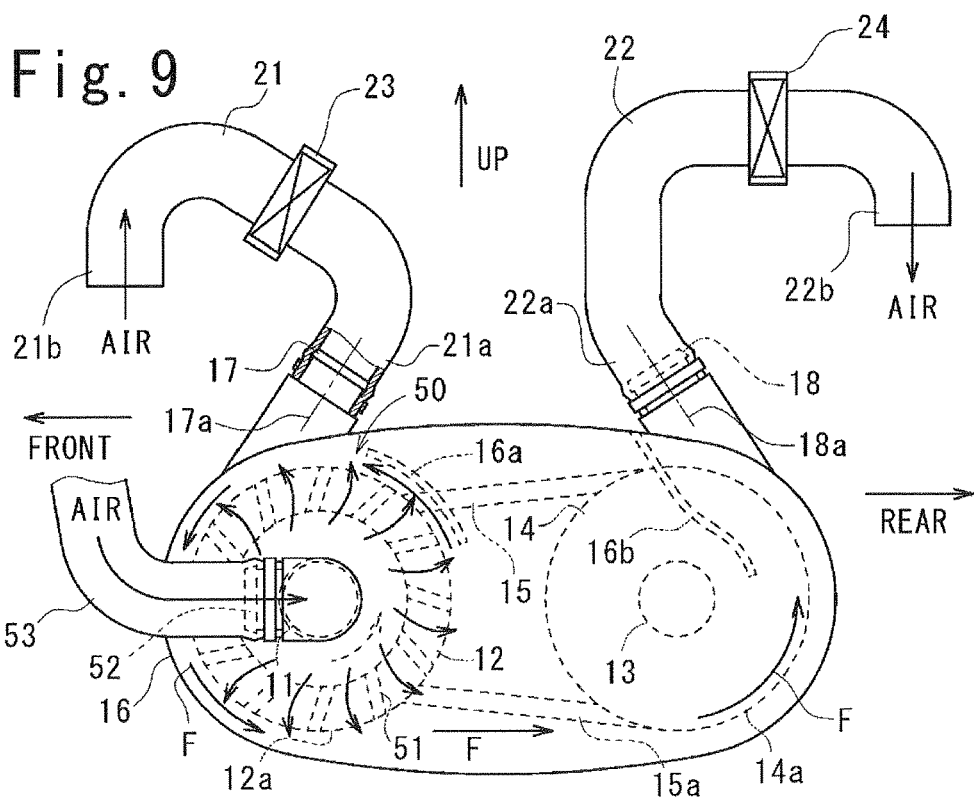

V-BELT TYPE CONTINUOUSLY VARIABLE TRANSMISSION

BACKGROUND OF THE INVENTION

Field of the Invention

The present invention relates to a V-belt type continuously variable transmission.

Description of the Related Art

There has conventionally been known a V-belt type continuously variable transmission of an air-cooled type to be mounted on a vehicle, which includes a housing that shapes the outline and accommodates a driving pulley, a driven pulley, and a V-belt provided around these pulleys. The driving pulley (or the driven pulley) is provided on its rear surface with fins to configure a centrifugal fan (see U.S. Pat. No. 8,911,312, for example).

In the V-belt type continuously variable transmission, the fins supply air taken from outside the housing into the housing along with rotation of the driving pulley. This arrangement enables the driving pulley, the driven pulley, and the V-belt accommodated in the housing to be cooled.

SUMMARY OF THE INVENTION

Increase in output of a motor (engine) has recently been desired for improvement in vehicle merchantability. Increase in output of the motor leads to increase in amount of heat generated in the V-belt type continuously variable transmission, which is thus required to have improved cooling performance. However, in the conventional V-belt type continuously variable transmission of the air-cooled type, the fins provided at the pulley supply cooling air into the housing. The amount of supplied air is accordingly dependent on rotation of the pulley. Particularly in a case where the pulley has low rotational speed or the pulley is stopped, the amount of supplied air is insufficient and cooling performance is accordingly inadequate.

If the fins are increased in size to increase air flow rate, the pulley has larger rotational resistance to cause driving loss.

The present invention has been made in view of the problems mentioned above, and an object thereof is to provide a V-belt type continuously variable transmission of an air-cooled type which inhibits increase in driving loss and improves cooling performance.

In order to achieve the object mentioned above, the present invention provides a V-belt type continuously variable transmission of an air-cooled type mounted on a vehicle, including: an intake port for taking air into the V-belt type continuously variable transmission; and an exhaust port for exhausting the taken air from the V-belt type continuously variable transmission; the V-belt type continuously variable transmission further including at least one of an electric intake fan connected to the intake port directly or via an intake duct, and an electric exhaust fan connected to the exhaust port directly or via an exhaust duct.

According to the above aspect of the present invention, at least one of the electric intake fan and the electric exhaust fan provides the V-belt type continuously variable transmission with air. The V-belt type continuously variable transmission is thus cooled independently from an operation state of the V-belt type continuously variable transmission, i.e. rotational speed of the pulley. Furthermore, fins provided at the driving pulley and/or the driven pulley in the V-belt type continuously variable transmission do not need to be increased in size. Moreover, it is not necessary to provide the fins themselves. It is thus possible to inhibit increase in driving loss by the fins as well as to improve cooling performance of the V-belt type continuously variable transmission.

The V-belt type continuously variable transmission preferably has any of the following configurations.

(1) The intake port is configured to take air along an air flow path in the V-belt type continuously variable transmission, and the exhaust port is configured to exhaust air along the air flow path.

According to the configuration (1), air is easily taken in via the intake port and easily exhausted via the exhaust port to and from the air flow path formed in the V-belt type continuously variable transmission. Furthermore, air taken in from the intake port and air exhausted from the exhaust port are inhibited from blocking an air flow in the air flow path. A flow rate of air in the V-belt type continuously variable transmission is thus increased effectively, to further improve cooling performance of the V-belt type continuously variable transmission.

(2) The V-belt type continuously variable transmission further includes: a driving shaft coupled to an output shaft of a motor; a driven shaft coupled to a drive axle configured to drive driving wheels or coupled to an input shaft of an auxiliary transmission; a driving pulley provided at the driving shaft; a driven pulley provided at the driven shaft; and a fin provided to at least one of the driving pulley and the driven pulley, and configured to supply air into the V-belt type continuously variable transmission. The driving shaft is optionally coupled directly or indirectly to the output shaft of the motor, and the driven shaft is optionally coupled directly or indirectly to a drive axle for driving the wheels or the input shaft of the auxiliary transmission.

According to the configuration (2), air supply due to at least one of the intake fan and the exhaust fan as well as air supply due to the fins provided at the driving pulley and/or the driven pulley are achieved in the V-belt type continuously variable transmission. It is thus possible to further increase the amount of air supplied into the V-belt type continuously variable transmission.

(3) The V-belt type continuously variable transmission further includes a fan control unit, wherein the fan control unit controls operation of at least one of the intake fan and the exhaust fan, so that temperature in the V-belt type continuously variable transmission is to be less than a predetermined temperature.

According to the configuration (3), control for operation of at least one of the intake fan and the exhaust fan enables control of the temperature in the V-belt type continuously variable transmission so as to be less than the predetermined temperature. Moreover, it is possible to prevent unnecessary operation of the intake fan and/or the exhaust fan, to inhibit unnecessary noise as well as to reduce energy consumption.

(4) The V-belt type continuously variable transmission has the configuration (3), and further includes a temperature sensor provided at the V-belt type continuously variable transmission and configured to measure temperature in the V-belt type continuously variable transmission, wherein the fan control unit controls operation of at least one of the intake fan and the exhaust fan in accordance with temperature measured by the temperature sensor.

According to the configuration (4), control for operation of at least one of the intake fan and the exhaust fan according to the temperature in the V-belt type continuously variable transmission measured directly by the temperature sensor enables accurate control of the temperature in the V-belt type continuously variable transmission so as to be less than the predetermined temperature.

(5) The V-belt type continuously variable transmission has the configuration (3), and the V-belt type continuously variable transmission has an input shaft coupled to an output shaft of a motor, and the fan control unit controls operation of at least one of the intake fan and the exhaust fan in accordance with temperature in the V-belt type continuously variable transmission, the temperature being estimated from at least one of rotational speed of the motor, an operation amount of an accelerator of the motor, and vehicle speed. The input shaft of the V-belt type continuously variable transmission is optionally coupled directly or indirectly to the output shaft of the motor.

According to the configuration (5), the temperature in the V-belt type continuously variable transmission is estimated accurately with no provision of any temperature sensor, so that the temperature in the V-belt type continuously variable transmission is accurately controlled so as to be not more than the predetermined temperature. The V-belt type continuously variable transmission needs to include no temperature sensor, thereby preventing increase in number of components as well as increase in number of assembling steps.

The V-belt type continuously variable transmission according to the present invention inhibits increase in driving loss and improves cooling performance.

BRIEF DESCRIPTION OF THE DRAWINGS

FIG. 6 is a schematic diagram of a V-belt type continuously variable transmission according to a second embodiment;

FIG. 7 is a schematic diagram of a V-belt type continuously variable transmission according to a third embodiment;

FIG. 8 is a schematic diagram of a V-belt type continuously variable transmission according to a variation;

FIG. 9 is a schematic diagram of a V-belt type continuously variable transmission according to another variation;

DETAILED DESCRIPTION OF THE INVENTION

A V-belt type continuously variable transmission according to an embodiment of the present invention will now be described below with reference to the accompanying drawings. A V-belt type continuously variable transmission according to each of the embodiments to be described below is mounted to a utility vehicle. For easier description, assume that the direction a utility vehicle travels corresponds to "forward" with respect to the utility vehicle, the V-belt type continuously variable transmission, and respective components, and right and left sides of a crew correspond to "right and left sides" of the utility vehicle, the V-belt type continuously variable transmission, and the respective components.

First Embodiment

Figure 1:
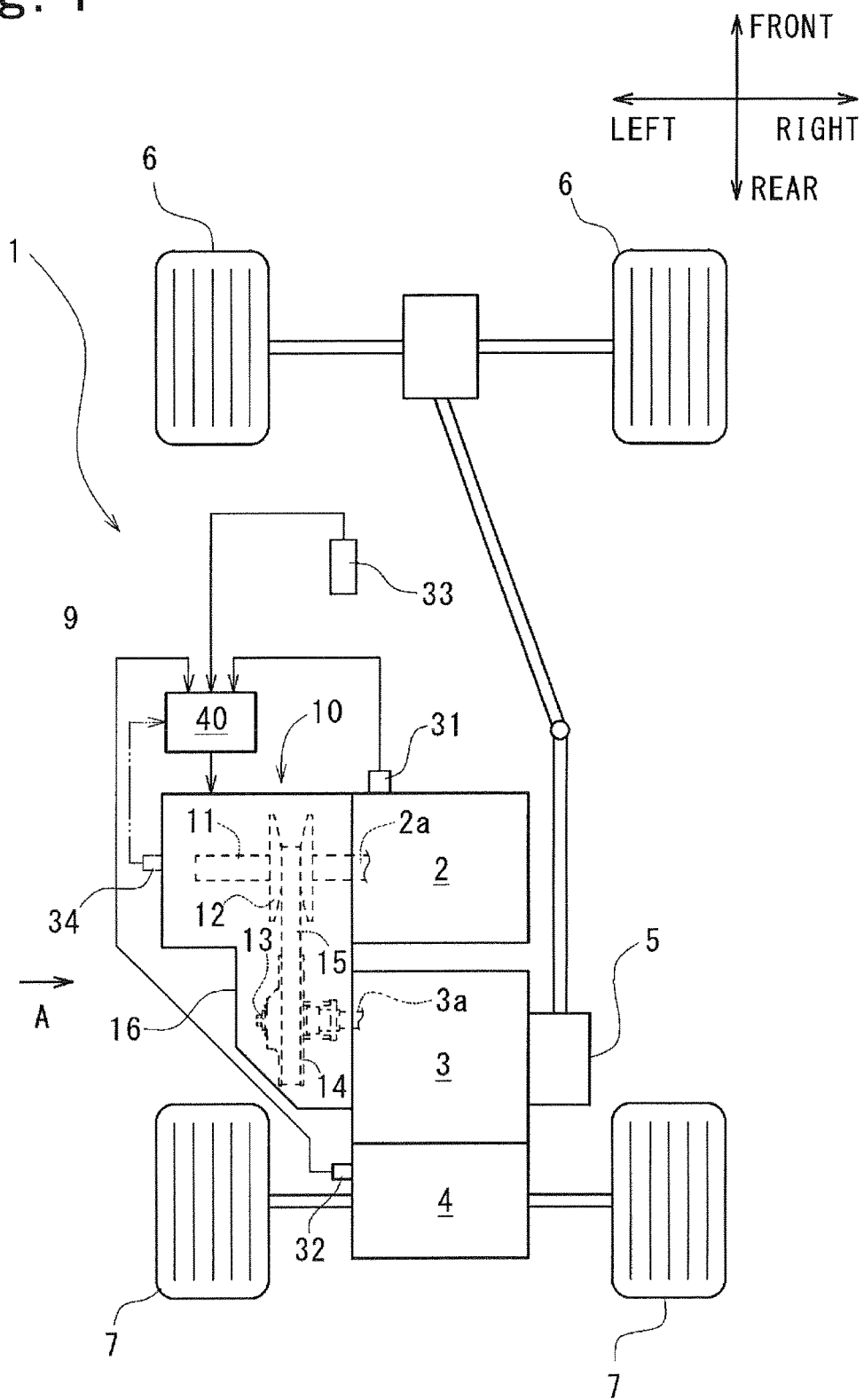
FIG. 1 is a schematic block diagram of a driving force transmission system of a utility vehicle according to an embodiment of the present invention.

FIG. 1 is a schematic block diagram of a driving force transmission system of a utility vehicle 1 equipped with a V-belt type continuously variable transmission 10 according to an embodiment of the present invention. As shown in FIG. 1, the utility vehicle 1 includes an engine (motor) 2 functioning as a driving source, an auxiliary transmission 3 disposed behind the engine 2, and the V-belt type continuously variable transmission 10 disposed along the left side surfaces of the engine 2 and the auxiliary transmission 3. The auxiliary transmission 3 is provided therebehind with a differential 4 for rear wheels 7, and is also provided on the right side with a two-wheel drive to four-wheel drive change mechanism 5.

The V-belt type continuously variable transmission 10 receives driving force outputted from the engine 2 and changes the driving force at a gear ratio according to a driving condition. And then the driving force is transmitted to the auxiliary transmission 3. The auxiliary transmission 3 is configured to achieve gear-shift between a plurality of gear positions including a high-speed forward gear position, a low-speed forward gear position, and a backward gear position. The driving force transmitted to the auxiliary transmission 3 is changed at predetermined gear ratio, and then distributed to the right and left rear wheels 7 via the differential 4. The two-wheel drive to four-wheel drive change mechanism 5 is configured to switch between a four-wheel driving state and a two-wheel driving state. The driving force transmitted to the auxiliary transmission 3 is transmitted to the rear wheels 7 as well as to front wheels 6 in the four-wheel driving state. In contrast, transmission to the front wheels 6 is blocked and only the rear wheels 7 are driven in the two-wheel driving state.

The V-belt type continuously variable transmission 10 includes a housing 16 that shapes the outline and accommodates a driving shaft 11, a driving pulley 12 provided on the driving shaft 11 so as to rotate integrally therewith, a driven shaft 13, a driven pulley 14 provided on the driven shaft 13 so as to rotate integrally therewith, and a V-belt 15 provided around the driving pulley 12 and the driven pulley 14. The driving shaft 11 is coupled to a crank shaft 2a functioning as an output shaft of the engine 2 so as to transmit driving force. The driven shaft 13 is coupled to a transmission input shaft 3a functioning as an input shaft of the auxiliary transmission 3 so as to transmit driving force. The V-belt 15 is made of rubber.

The V-belt type continuously variable transmission 10 generates heat due to friction at transmission of driving force between the pulleys 12 and 14 and the V-belt 15, repeated bending of the V-belt 15 around the pulleys, and the like upon changing driving force received from the engine 2 and transmitting the changed driving force to the auxiliary transmission 3. The V-belt type continuously variable transmission 10 thus includes a cooling system (see FIG. 2) to be described later, configured to inhibit such heat generation.

Figure 2:
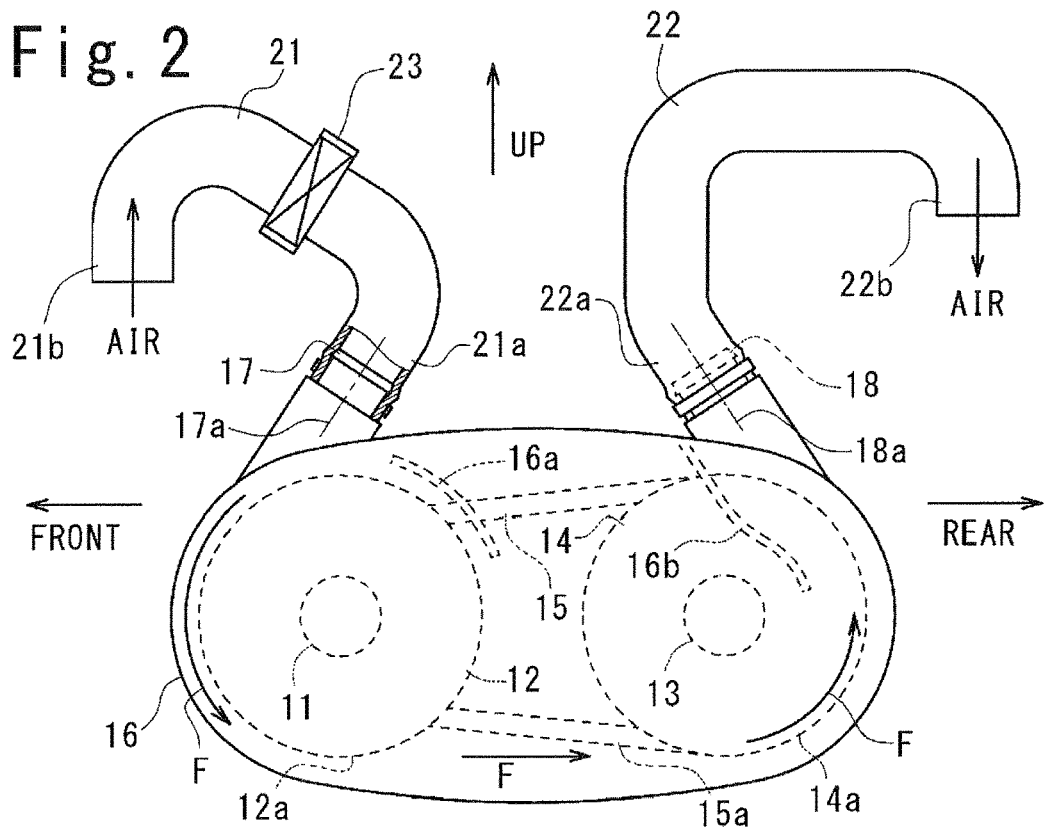
FIG. 2 is a schematic diagram of a V-belt type continuously variable transmission.

FIG. 2 is a diagram viewed along arrow A indicated in FIG. 1 and schematically shows the cooling system of the V-belt type continuously variable transmission 10. As shown in FIG. 2, the housing 16 is provided, above the driving shaft 11, with an intake port 17, and is provided, above the driven shaft 13, with an exhaust port 18. The intake port 17 has a cylindrical shape and penetrates the housing 16 from inside to outside. The intake port 17 has an axis 17a extending backward and upward to along a tangent at an upper front point of an outer periphery 12a of the driving pulley 12. The exhaust port 18 has a cylindrical shape and penetrates the housing 16 from inside to outside. The exhaust port 18 has an axis 18a extending forward and upward along a tangent at an upper rear point of an outer periphery 14a of the driven pulley 14.

The housing 16 includes a driving shaft air guide wall 16a and a driven shaft air guide wall 16b. The driving shaft air guide wall 16a is provided behind and above the driving pulley 12 and has a circular arc shape along the outer periphery 12a with a predetermined gap being provided therebetween. The driven shaft air guide wall 16b is provided at an upper rear portion of the driven pulley 14 to face the driven pulley 14 in the vehicle width direction and extends backward and downward from ahead of the exhaust port 18. The driven shaft air guide wall 16b separates an air flow path F to the exhaust port 18 from the driving shaft 11.

The intake port 17 is connected with an intake duct 21. The intake duct 21 has a proximal end 21a connected to the intake port 17 and an open distal end 21b. The exhaust port 18 is connected with an exhaust duct 22. The exhaust duct 22 has a proximal end 22a connected to the exhaust port 18 and an open distal end 22b. The intake duct 21 and the exhaust duct 22 are curved downward at the distal ends 21b and 22b into the so-called snorkel shape, to inhibit foreign matter such as water, dust, sand, or dirt from entering the V-belt type continuously variable transmission 10 through the distal ends 21b and 22b.

Figure 3:
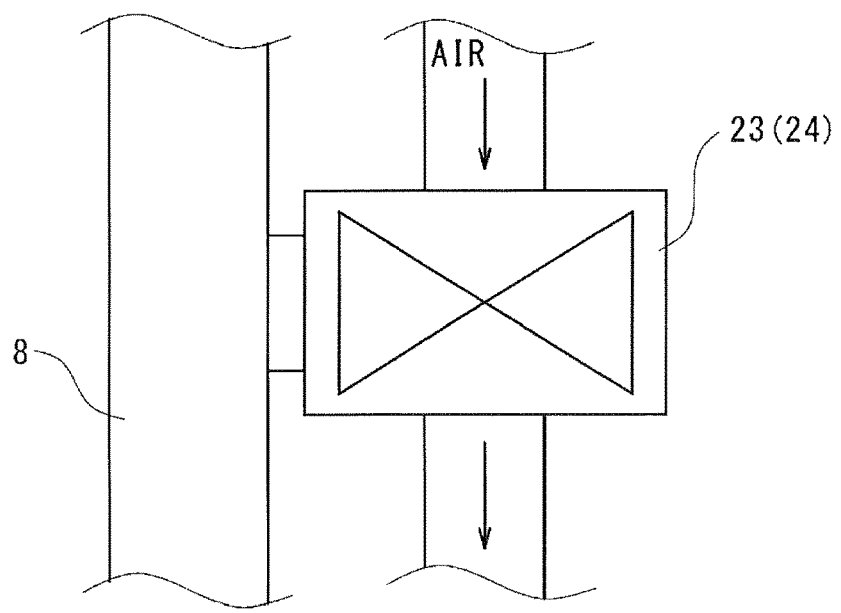
FIG. 3 is a schematic diagram of a mounting structure for an axial fan.

The intake duct 21 is provided at a halfway portion with an axial intake fan 23. The intake fan 23 is of an electric type and operation thereof is controlled by a fan control unit 40 (see FIG. 1). The intake fan 23 in operation supplies air taken from the distal end 21b of the intake duct 21 into the housing 16 via the intake port 17 of the housing 16. The intake fan 23 has air blow capacity to supply an adequate amount of cooling air for an amount of heat generated at the V-belt type continuously variable transmission 10 relative to driving force transmitted from the engine 2. As schematically shown in FIG. 3, the intake fan 23 is supported by a chassis frame 8 that configures a chassis of the utility vehicle 1.

As shown in FIG. 2, air taken into the housing 16 is supplied from the upper end of the driving pulley 12 along the tangent at the upper front point of the outer periphery 12a, and is subsequently guided counterclockwise, along the inner peripheral surface of the housing 16, to the front half of the driving pulley 12, a lower portion 15a of the provided V-belt 15, and the rear half of the driven pulley 14 in the mentioned order. The air is then guided to the exhaust port 18 along the tangent at the upper rear point of the driven pulley 14, and is exhausted from the housing 16 via the exhaust duct 22.

In summary, an air-cooled cooling system is constituted of at least the housing 16, the intake port 17, the exhaust port 18, the intake duct 21, the exhaust duct 22, and the intake fan 23. The housing 16 is also provided therein with the air flow path F for a cooling air, which is formed by the intake port 17, the front half of the driving pulley 12, the lower portion 15a of the provided V-belt 15, the rear half of the driven pulley 14, and the exhaust port 18.

Air guided to the rear half of the outer periphery 14a of the driven pulley 14 is regulated by the driven shaft air guide wall 16b so as not to flow back toward the driving shaft 11. Air increased in temperature by flowing in the housing 16 from the driving shaft 11 to the driven shaft 13 and cooling respective portions is thus prevented from flowing back toward the driving shaft 11. The interior of the housing 16 is cooled efficiently in this configuration.

Figure 4:
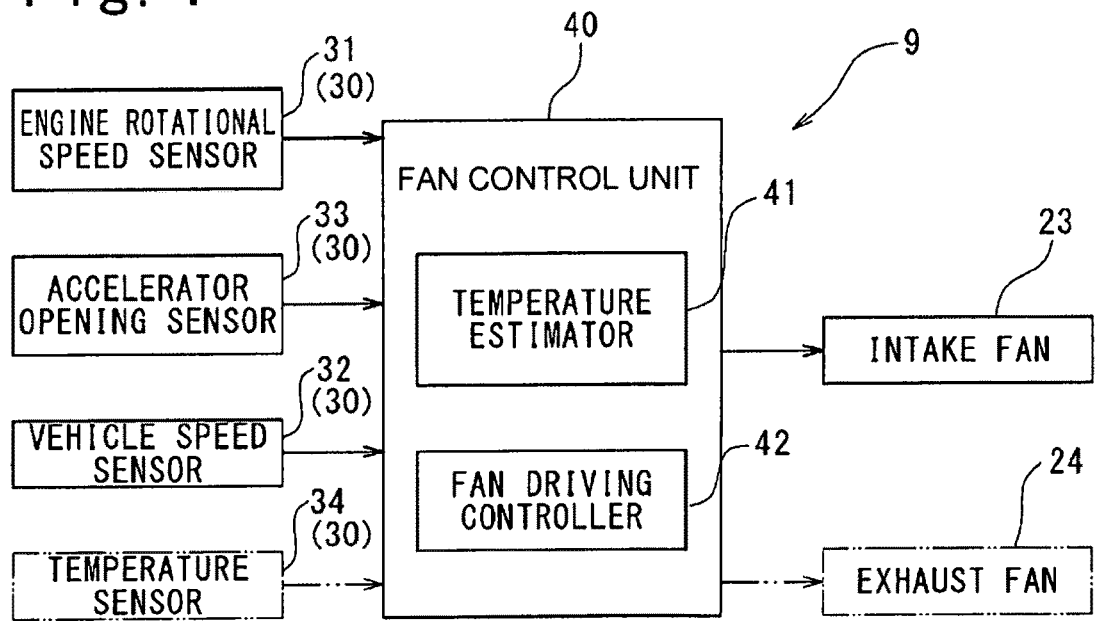
FIG. 4 is a block diagram of a schematic configuration of a fan control system.
Figure 5:
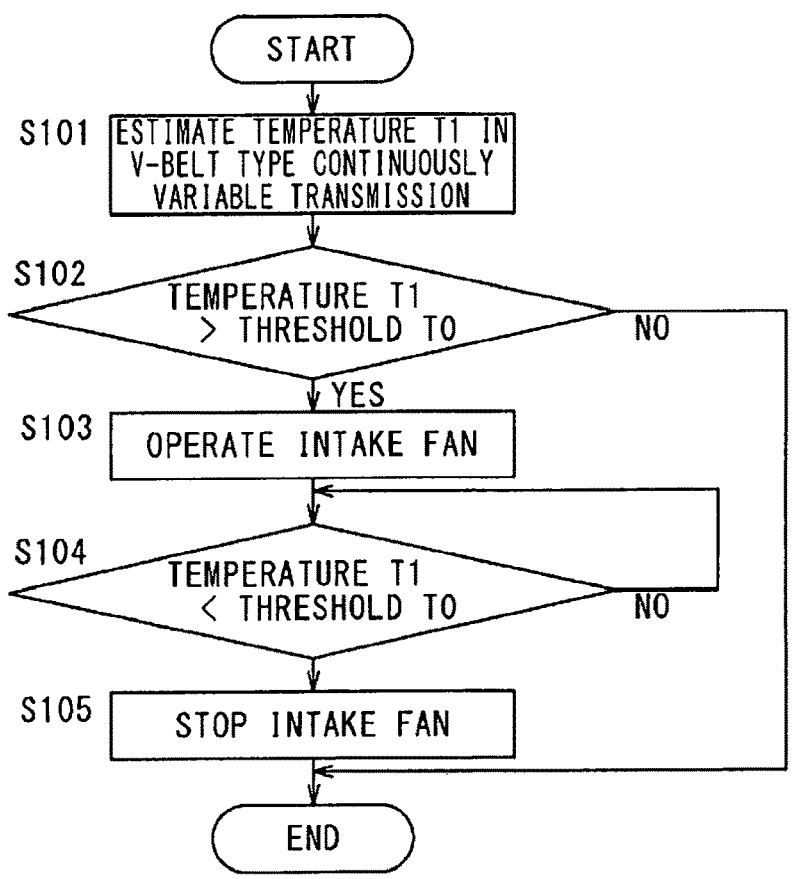
FIG. 5 is an explanatory flowchart of operation of the fan control system.

Operation of the intake fan 23 will be described next with reference to FIGS. 4 and 5. FIG. 4 is a block diagram of a schematic configuration of a control system 9 configured to control operation of the intake fan 23. FIG. 5 is an explanatory flowchart of operation of the control system 9. Initially with reference to FIG. 4, the control system 9 includes a sensor 30 functioning as an input unit, the fan control unit 40, and the intake fan 23 functioning as an output unit. The fan control unit 40 controls operation of the intake fan 23 in accordance with a signal transmitted from the sensor 30.

The sensor 30 includes at least one of an engine rotational speed sensor 31 for measuring an engine rotational speed, a vehicle speed sensor 32 for detecting vehicle speed, and an accelerator opening sensor 33 for detecting an accelerator opening degree (operation amount) of an accelerator pedal (not shown) configured to operate the engine 2. As shown in FIG. 1, the engine rotational speed sensor 31 is provided at the engine 2, the vehicle speed sensor 32 is provided at the auxiliary transmission 3, and the accelerator opening sensor 33 is provided at the accelerator pedal, a throttle body, or an engine accelerator lever (not shown).

The fan control unit 40 essentially includes a known computer having a CPU, a memory, a storage unit, and the like, and software mounted in the computer. The fan control unit 40 includes a temperature estimator 41 configured to estimate temperature (ambient temperature) in the V-belt type continuously variable transmission 10, and a fan driving controller 42 configured to control operation of the intake fan 23.

Specifically, the temperature estimator 41 estimates temperature in the V-belt type continuously variable transmission 10 in accordance with a signal received from the sensor 30. The temperature estimator 41 is configured to estimate driving force transmitted from the engine 2 to the V-belt type continuously variable transmission 10 in accordance with engine rotational speed, vehicle speed, an accelerator opening degree, or the like, estimate an amount of heat generated in the V-belt type continuously variable transmission 10 in accordance with the estimated driving force, and estimate temperature (ambient temperature) T1 in the V-belt type continuously variable transmission 10.

The fan driving controller 42 controls to drive the intake fan 23 if the temperature (ambient temperature) T1 estimated by the temperature estimator 41 is more than a predetermined threshold T0 and then controls to stop the intake fan 23 if the temperature T1 becomes less than the threshold T0.

The predetermined threshold T0 is set in consideration of heat resistance of the rubber V-belt 15. For example, the predetermined threshold T0 is set to be less than heat resistant temperature at which rubber exerts its function without any problem. The fan driving controller 42 may be configured to control to turn ON and OFF the intake fan 23, or may be configured to variably control rotational speed of the intake fan 23.

Operation of the control system 9 will now be described with reference to the flowchart in FIG. 5. Initially in step S101, the temperature estimator 41 estimates the temperature T1 in the V-belt type continuously variable transmission 10 in accordance with a signal transmitted from the sensor 30. The temperature estimator 41 constantly conducts estimation of the temperature T1 while the control system 9 is in operation.

The fan driving controller 42 subsequently determines whether or not the temperature T1 is more than the predetermined threshold T0 (step S102). In step S102, if determining that the temperature T1 is more than the threshold T0, the fan driving controller 42 drives the intake fan 23 (step S103).

The fan driving controller 42 continuously controls driving of the intake fan 23 until the temperature T1 estimated by the temperature estimator 41 subsequently becomes less than the predetermined threshold T0 (step S104). If determining that the temperature T1 has become less than the threshold T0, the fan driving controller 42 stops the intake fan 23 (step S105).

The intake fan 23 is thus driven if the temperature T1 in the V-belt type continuously variable transmission 10 becomes more than the predetermined threshold T0 due to heat generated while the V-belt type continuously variable transmission 10 changes driving force transmitted from the engine 2 at a predetermined gear ratio and outputs the changed driving force to the auxiliary transmission 3. In the V-belt type continuously variable transmission 10, air is supplied into the housing 16 from the intake port 17 via the intake duct 21, and the air thus taken in is guided from the driving shaft 11 to the driven shaft 13 along the inner peripheral surface of the housing 16 and is exhausted from the exhaust port 18 to outside the housing 16 via the exhaust duct 22. The temperature T1 in the V-belt type continuously variable transmission 10 is thus controlled to be not more than the predetermined threshold T0.

The V-belt type continuously variable transmission 10 configured as described above achieves the following effects.

(1) The electric intake fan 23 provides the V-belt type continuously variable transmission 10 with air, so that the V-belt type continuously variable transmission 10 is cooled independently from the operation state of the V-belt type continuously variable transmission 10, i.e. rotational speed of the driving pulley 12 and/or the driven pulley 14. Furthermore, the driving pulley 12 and/or the driven pulley 14 in the V-belt type continuously variable transmission does not need fins. It is thus possible to inhibit increase in driving loss by the fins as well as improve cooling performance of the V-belt type continuously variable transmission 10.

(2) The intake port 17 and the exhaust port 18 of the housing 16 are provided so that the respective axes 17a and 18a extend along the air flow path F in the housing 16. Accordingly, air is easily taken in from the intake port 17 and air is easily exhausted from the exhaust port 18 to and from the air flow path F in the V-belt type continuously variable transmission 10. Furthermore, with this arrangement, air taken in from the intake port 17 and air exhausted from the exhaust port 18 are inhibited from blocking an air flow in the air flow path F. A flow rate of air in the V-belt type continuously variable transmission 10 is thus increased effectively, to further improve cooling performance of the V-belt type continuously variable transmission 10.

(3) The fan driving controller 42 drives the intake fan 23 if the temperature T1 in the V-belt type continuously variable transmission 10 estimated by the temperature estimator 41 is more than the predetermined threshold T0. The temperature T1 in the V-belt type continuously variable transmission 10 is thus controlled to be not more than the threshold T0. Moreover, it is possible to prevent unnecessary operation of the intake fan 23, to inhibit noise caused by the unnecessarily driven intake fan 23 as well as reduce energy consumption.

(4) The temperature estimator 41 can estimates accurately the temperature T1 in the V-belt type continuously variable transmission 10 in accordance with at least one signal from the engine rotational speed sensor 31, the vehicle speed sensor 32, and the accelerator opening sensor 33, thereby to accurately control the temperature T1 so as to be not more than the threshold T0. The V-belt type continuously variable transmission 10 needs to include no temperature sensor, thereby preventing increase in number of components as well as increase in number of assembling steps.

As shown by broken lines in FIG. 1, the V-belt type continuously variable transmission 10 is alternatively provided with a temperature sensor 34 for measuring the temperature (ambient temperature) T1 in the V-belt type continuously variable transmission 10. In this case, as indicated by broken arrows in FIG. 4, the fan driving controller 42 alternatively controls driving of the intake fan 23 in accordance with a signal from the temperature sensor 34. Possibly cancelled in this case is estimation of the temperature T1 in the V-belt type continuously variable transmission according to signals from the engine rotational speed sensor 31, the vehicle speed sensor 32, and/or the accelerator opening sensor 33. The temperature T1 in the V-belt type continuously variable transmission 10 is not estimated but measured directly to achieve further accurate control to the temperature T1 so as to be not more than the threshold T0.

Second Embodiment

FIG. 6 shows a V-belt type continuously variable transmission 120 according to the second embodiment. The V-belt type continuously variable transmission 120 according to the second embodiment is different from the V-belt type continuously variable transmission 10 according to the first embodiment in that the V-belt type continuously variable transmission 120 additionally includes a centrifugal fan 50. The centrifugal fan 50 includes a plurality of radially extending fins 51 provided at the rear surface of the driving pulley 12, a second intake port 52 causing the plurality of fins 51 and the exterior of the housing 16 to communicate with each other, and a second intake duct 53 connected to the second intake port 52.

Specifically, the plurality of fins 51 enables air outside the housing 16 to be taken into the housing 16 from the second intake port 52 via the second intake duct 53 and enables air to be discharged to the outer periphery of the driving pulley 12, along with rotation of the driving pulley 12. The driving pulley 12 rotates counterclockwise, so that air is guided by the inner peripheral surface of the housing 16 and the driving shaft air guide wall 16a and is discharged along the air flow path F in which air also flows counterclockwise.

According to the present embodiment, air supply by the intake fan 23 as well as air supply by the centrifugal fan 50 are achieved in the V-belt type continuously variable transmission 10. It is thus possible to further increase the amount of air supplied into the V-belt type continuously variable transmission 10. Furthermore, the centrifugal fan 50 discharges air counterclockwise to the outer periphery of the driving pulley 12. The air flow is likely to follow the air flow in an intake channel by the intake fan 23. This leads to effective increase in amount of air in the V-belt type continuously variable transmission 10.

The present embodiment exemplifies the case where the centrifugal fan 50 is provided at the driving pulley 12, while the present invention is not limited to this case. Alternatively, the centrifugal fan 50 may be provided at the driven pulley 14, or may be provided at each of the driving pulley 12 and the driven pulley 14. Although not shown, in the case where the centrifugal fan 50 is provided at the driven pulley 14, the centrifugal fan 50 similarly includes fins provided at the rear surface of the driven pulley 14, an intake port causing the fins and the exterior of the housing 16 to communicate with each other, and an intake duct connected to the intake port.

Third Embodiment

FIG. 7 shows a V-belt type continuously variable transmission 130 according to the third embodiment. The V-belt type continuously variable transmission 130 according to the third embodiment is different from the V-belt type continuously variable transmission 10 according to the first embodiment in that the intake fan 23 is replaced with an exhaust fan 24 provided at a halfway portion of the exhaust duct 22.

The exhaust fan 24 is of an electric type and operation thereof is controlled by the fan control unit 40 (see FIGS. 1 and 4). The exhaust fan 24 in operation takes in air inside the housing 16 from the exhaust port 18 and exhausts the air to outside the housing 16 via the exhaust duct 22. The exhaust fan 24 has air blow capacity to exhaust an adequate amount of cooling air for an amount of heat generated at the V-belt type continuously variable transmission 10 relative to driving force transmitted from the engine 2. Similarly to the intake fan 23, the exhaust fan 24 is supported by the chassis frame 8.

The electric exhaust fan 24 according to the present embodiment exhausts air from inside to outside the V-belt type continuously variable transmission 10, to form an air flow along the air flow path F toward the exhaust port 18 in the V-belt type continuously variable transmission 10. The air flow along the air flow path F toward the exhaust port enables air to be taken into the housing 16 from the intake port 17 via the intake duct 21. Similarly to the intake fan 23, the driving pulley 12 and/or the driven pulley 14 does not need fins, and thus inhibits increase in driving loss as well as improves cooling performance.

Unlike the above embodiments, the V-belt type continuously variable transmission has only to include at least one of the intake fan 23 and the exhaust fan 24, and may additionally include the centrifugal fan 50. Specifically, the intake fan 23 and the exhaust fan 24 are alternatively combined with each other as shown in FIG. 8. Still alternatively, the intake fan 23, the exhaust fan 24, and the centrifugal fan 50 are combined together as shown in FIG. 9.

Figure 10:
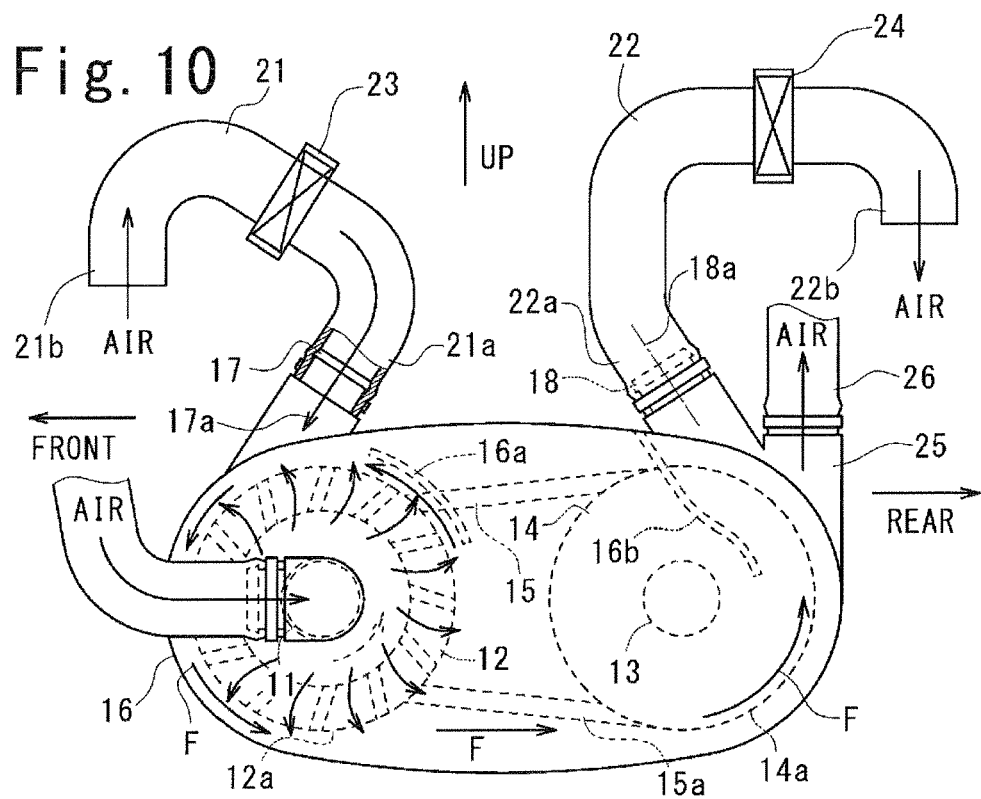
FIG. 10 is a schematic diagram of a V-belt type continuously variable transmission according to still another variation.

In a case where air is supplied by a plurality of intake systems including the intake fan 23 and the centrifugal fan 50 as shown in FIG. 10, there are alternatively provided a second exhaust port 25 and a second exhaust duct 26 connected to the second exhaust port 25. Specifically, there is alternatively provided a plurality of exhaust systems in order to achieve an exhaust amount corresponding to an intake amount increased by provision of the plurality of intake systems. Also when there is provided a single intake system including either one of the intake fan 23 or the centrifugal fan 50, the second exhaust port 25 is optionally provided in addition to the exhaust port 18.

Figure 11:
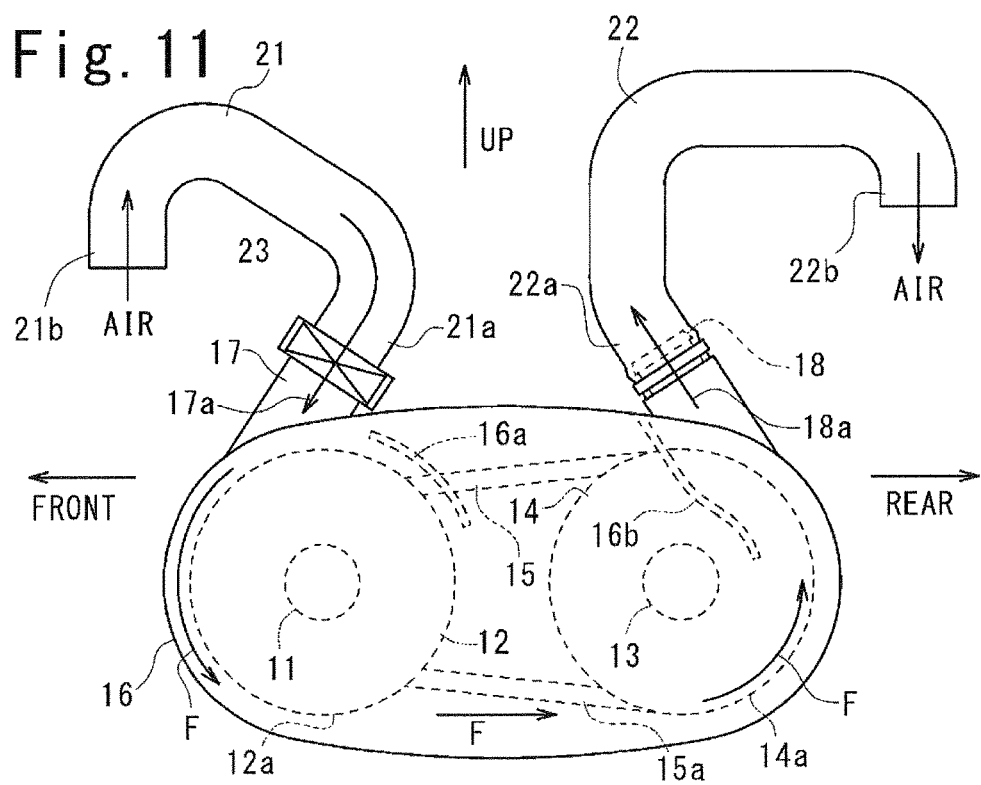
FIG. 11 is a schematic diagram of a V-belt type continuously variable transmission according to a still different variation.

The intake fan 23 and the exhaust fan 24 according to the above embodiments are provided at the halfway portions of the intake duct 21 and the exhaust duct 22, respectively. However, the present invention is not limited to this case. As shown in FIG. 11, the intake fan 23 has a discharge port that is alternatively attached directly to the intake port 17. Although not shown, the exhaust fan 24 has a suction port that is alternatively attached directly to the exhaust port 18.

Figure 12:
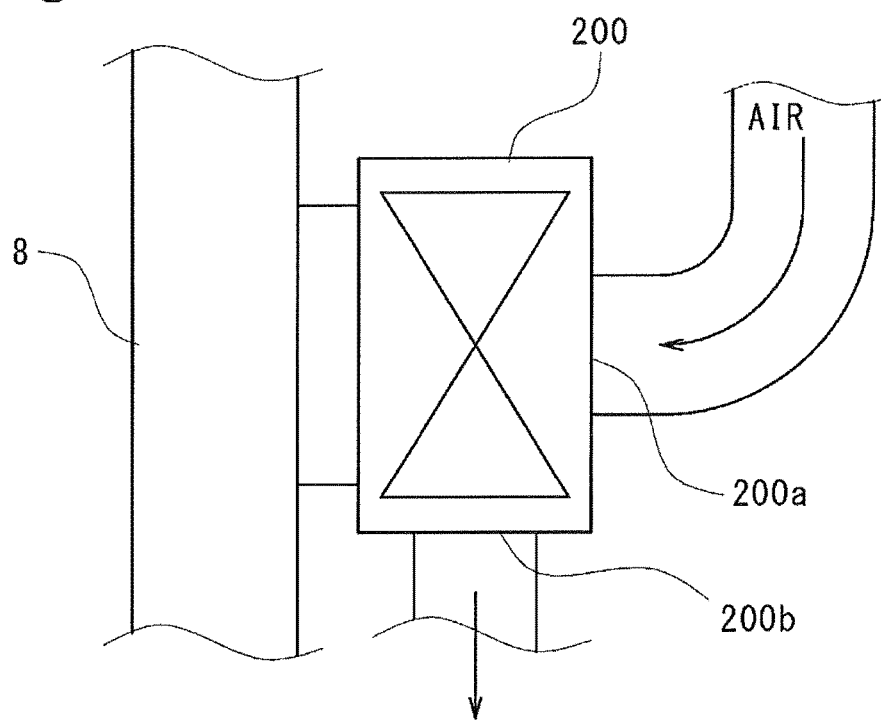
FIG. 12 is a schematic diagram of a mounting structure for a centrifugal fan.

The intake fan 23 and the exhaust fan 24 according to the above embodiments are axial fans. However, the present invention is not limited to this case. These fans are alternatively provided as centrifugal fans 200. As shown in FIG. 12, the centrifugal fans 200 each have a suction port 200a and a discharge port 200b of which axes cross each other substantially at 90 degrees. In the case where the centrifugal fan 200 is provided as an intake fan, the discharge port 200b may be connected to the intake port 17 of the housing 16. In the case where the centrifugal fan 200 is provided as an exhaust fan, the suction port 200a may be connected to the exhaust port 18 of the housing 16. Although not shown, also in a case where the intake fan and/or the exhaust fan is provided as a centrifugal fan, the fan is alternatively attached directly to the intake port 17 or the exhaust port 18 of the housing 16.

The front wheels 6 and the rear wheels 7 functioning as driving wheels are driven via the auxiliary transmission 3 in the above embodiments. However, the present invention is not limited to this case. Alternatively, the V-belt type continuously variable transmission 10 directly transmits driving force to a drive axle (not shown) configured to drive the driving wheels, not via the auxiliary transmission 3.

The above embodiments each exemplify the V-belt type continuously variable transmission mounted on a utility vehicle. However, the present invention is not limited to this case. The V-belt type continuously variable transmission according to the present embodiment is applicable to a utility vehicle as well as to various vehicles such as an all terrain vehicle (ATV), a sport recreational vehicle (SRV), a recreational utility vehicle (RUV), an irregular ground traveling vehicle, a saddled vehicle, and a motorcycle.

The present invention is optionally modified or changed in various manners without departing from the spirit and scope of the present invention recited in the following claims.

What is claimed is:

1. An air-cooled V-belt type continuously variable transmission mounted on a vehicle, comprising:
    an intake port for taking air into the V-belt type continuously variable transmission; and
    an exhaust port for exhausting air from the V-belt type continuously variable transmission;
    the V-belt type continuously variable transmission further comprising at least one of an electric intake fan connected to the intake port directly or via an intake duct, and an electric exhaust fan connected to the exhaust port directly or via an exhaust duct, wherein
    the intake port is configured to take air along an air flow path in the V-belt type continuously variable transmission,
    the exhaust port is configured to exhaust air along the air flow path, and
    the V-belt type continuously variable transmission further comprises:
        a driving shaft coupled to an output shaft of a motor;
        a driven shaft coupled to a drive axle configured to drive driving wheels or coupled to an input shaft of an auxiliary transmission;
        a driving pulley provided at the driving shaft;
        a driven pulley provided at the driven shaft; and
        a housing shaping an outline of the V-belt type continuously variable transmission, wherein the air flow path includes an arcuate air flow path portion that guides air to a front portion of the outer periphery of the driving pulley along an inner periphery of the housing, and the intake port is provided at the housing to be positioned just above the driving shaft, and has an axis extending backward and upward along a tangent at an upper front point of an outer periphery of the driving pulley so that the axis tangentially connects to the flow path portion.

2. The V-belt type continuously variable transmission according to claim 1, further comprising:
a driving shaft coupled to an output shaft of a motor;
a driven shaft coupled to a drive axle configured to drive driving wheels or coupled to an input shaft of an auxiliary transmission;
a driving pulley provided at the driving shaft;
a driven pulley provided at the driven shaft; and
a fin provided to at least one of the driving pulley and the driven pulley, and configured to draw air into the V-belt type continuously variable transmission.

3. The V-belt type continuously variable transmission according to claim 1, further comprising a fan control unit; wherein
the fan control unit controls operation of at least one of the intake fan and the exhaust fan, so that temperature in the V-belt type continuously variable transmission is to be less than a predetermined temperature,
the V-belt type continuously variable transmission has an input shaft coupled to an output shaft of a motor, and
the fan control unit controls operation of at least one of the intake fan and the exhaust fan in accordance with temperature in the V-belt type continuously variable transmission, the temperature being estimated from at least one of rotational speed of the motor, an operation amount of an accelerator of the motor, and vehicle speed.

4. The V-belt type continuously variable transmission according to claim 1, further comprising:
a driving shaft coupled to an output shaft of a motor;
a driven shaft coupled to a drive axle configured to drive driving wheels or coupled to an input shaft of an auxiliary transmission;
a driving pulley provided at the driving shaft; and
a driven pulley provided at the driven shaft, wherein the exhaust port has an axis extending frontward and upward along a tangent at an upper rear point of an outer periphery of the driven pulley.

5. An air-cooled V-belt type continuously variable transmission mounted on a vehicle, comprising:
an intake port for taking air into the V-belt type continuously variable transmission;
an exhaust port for exhausting air from the V-belt type continuously variable transmission; and
a fan control unit, wherein:
the V-belt type continuously variable transmission further comprising at least one of an electric intake fan connected to the intake port directly or via an intake duct, and an electric exhaust fan connected to the exhaust port directly or via an exhaust duct;
the fan control unit controls operation of at least one of the intake fan and the exhaust fan, so that temperature in the V-belt type continuously variable transmission is to be less than a predetermined temperature;
the intake port is configured to take in air along an air flow path in the V-belt type continuously variable transmission;
the exhaust port is configured to exhaust air flowing along the air flow path;
the V-belt type continuously variable transmission has an input shaft coupled to an output shaft of a motor;
the fan control unit controls operation of at least one of the intake fan and the exhaust fan in accordance with temperature in the V-belt type continuously variable transmission, the temperature being estimated from at least one of rotational speed of the motor, an operation amount of an accelerator of the motor, and vehicle speed;
the fan control unit has a temperature estimator configured to estimate temperature in the V-belt type continuously variable transmission; and
the temperature estimator is configured to: estimate driving force transmitted from the motor to the V-belt type continuously variable transmission in accordance with rotational speed of the motor, the operational amount of the accelerator of the motor, and vehicle speed; estimate an amount of heat generated in the V-belt type continuously variable transmission in accordance with the estimated driving force; and estimate temperature in the V-belt type continuously variable transmission according to the estimated amount of heat.

* * * * *